United States Patent [19]

Talan

[11] 4,309,136
[45] Jan. 5, 1982

[54] FASTENING DEVICE

[75] Inventor: Jacques Talan, Paris, France

[73] Assignee: Bassan & Cie., Paris, France

[21] Appl. No.: 51,212

[22] Filed: Jun. 22, 1979

[30] Foreign Application Priority Data

Jul. 10, 1978 [FR] France ................. 78 20478

[51] Int. Cl.³ ............................................. F16B 13/04
[52] U.S. Cl. .......................................... 411/36; 411/34
[58] Field of Search ................. 85/71, 75, 46; 411/34, 411/35, 36, 37, 38

[56] References Cited

U.S. PATENT DOCUMENTS 2,918,841 12/1959 Poupitch ............................. 411/36
3,381,566 5/1968 Passer ..................................... 85/71

FOREIGN PATENT DOCUMENTS 2637797 2/1978 Fed. Rep. of Germany .......... 85/75
598497 4/1978 Switzerland ............................ 85/71
1475839 6/1977 United Kingdom .................... 85/76

Primary Examiner—James T. McCall
Attorney, Agent, or Firm—Michael J. Striker

[57] ABSTRACT

This fastening device, notably for fixing an object to a hollow partition or wall, comprises a splined plug, a screw and a nut; the bottom of the gaps formed between the splines is provided with a slit, except at the plug ends, to enable the splines to separate and expand when contracted as a consequence of the tightening of the nut by means of the screw; the nut carries lugs corresponding to the gaps formed between the plug splines so that when the device is tightened home the lugs registering with the gaps engages the latter to assist in reinforcing the locking action exerted by the expanded and twisted splines against the inner face of the partition.

5 Claims, 8 Drawing Figures

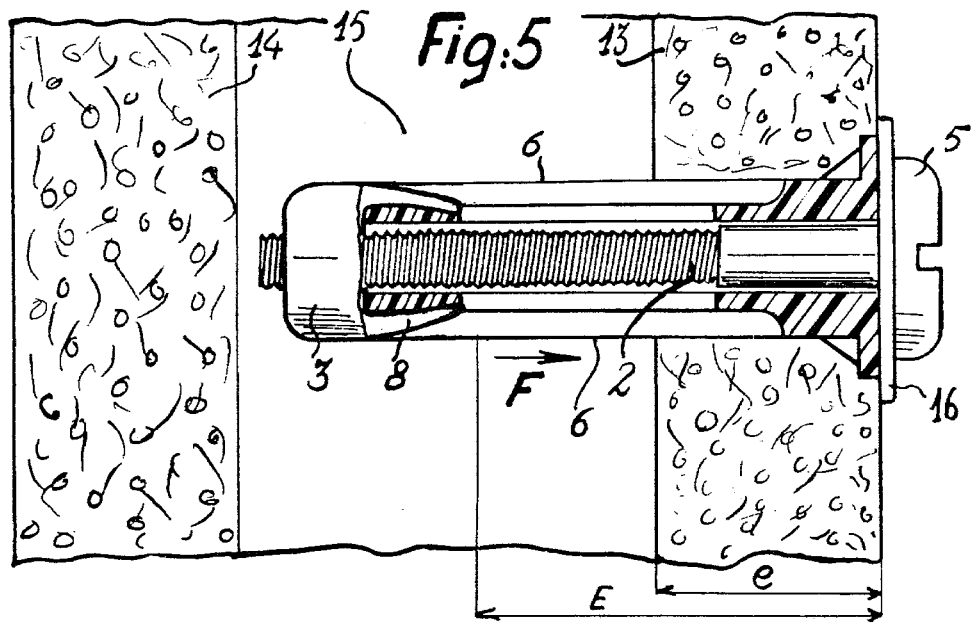
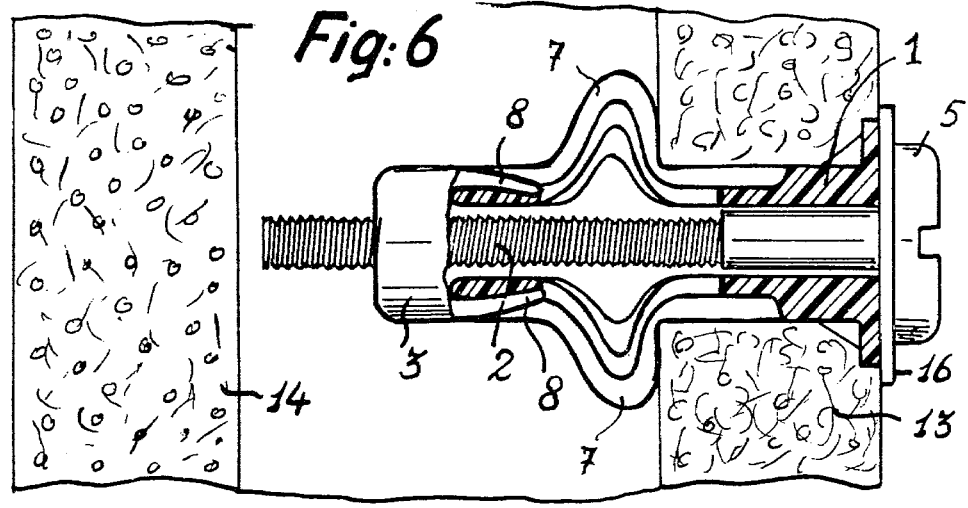
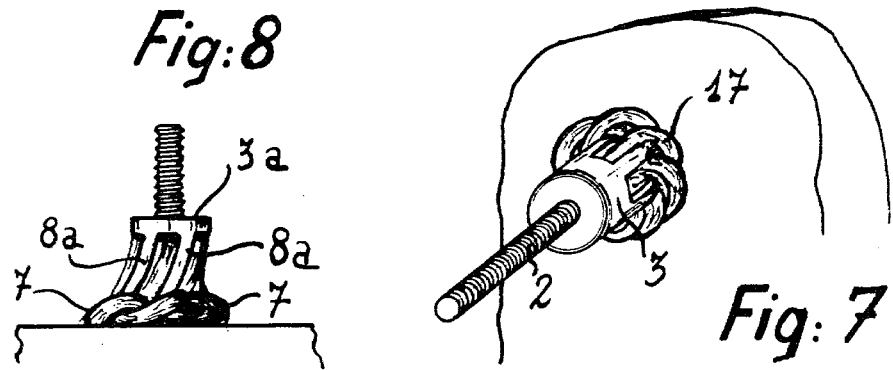

FASTENING DEVICE

BACKGROUND OF THE INVENTION

This invention relates to a fastening device for securing any element or object to a wall or partition. This device is intended more particularly for fixing objects to hollow walls or to walls made of a relatively brittle material, notably chipboard or porous concrete.

This device is of the type wherein a tightening screw is provided inside a tubular plug of deformable material disposed between the screw head and a nut carried by the opposite end of the screw. On the other hand, on at least one portion of the plug length, a plurality of longitudinal weakening lines forming flexible splines between them are formed.

Under these conditions, when the screw is tightened for moving the nut towards the screw head, the plug is caused to expand, so that the flexible splines undergo a deformation and may even become loose in relation to each other, due to the weakening lines provided for this purpose. The distorsion of the plug and more particularly of the splines thereof is intended for anchoring the fastening device in the bore into which the same has been introduced.

However, in actual practice it was observed that the anchoring action obtained with plugs of this specific type is not always reliable, due to the fact that this action results only from the distortion of the deformable splines of the plug, which does not occur under the best possible conditions since the tightening nut can rotate in relation to the plug during the plug expansion.

Besides, in most instances, due to the resiliency of the plug material no tearing effect is observed within the weakening lines separating the adjacent splines of the plug. Therefore, these splines remain attached to one another and this precludes the possibility of producing a sufficient torsion of the splines on themselves in order to provide a really efficient fastening device. In fact, the plug is simply expanded and this is not sufficient for obtaining a fully efficient anchorage.

SUMMARY OF THE INVENTION

It is the primary object of this invention to provide a fastening device of the type set forth hereinabove, but so designed as to impart a considerably improved efficiency thereto under substantially all fixing conditions.

For this purpose, the tightening nut comprises on its plug-facing end a plurality of integral deformable lugs corresponding in number to the gaps or grooves existing between the longitudinal splines formed on the outer surface of the plug, and each lug is engageable in one of these gaps. On the other hand, the bottom of each gap or groove has formed therein a slit equally spaced from the pair of adjacent splines, this slit extending throughout the plug length except at the two ends thereof.

Due to the engagement of the nut lugs between the plug splines, the nut is rotatably solid with the corresponding end of the plug and therefore cannot rotate in relation thereto during the plug rotation and distortion. Consequently, the plug splines distortion takes place under the best possible conditions, inasmuch as they are not likely to remain attached to each other, since they are originally separated by the slits formed in the gaps between adjacent splines. Now, when tightening the screw, a combined torsion and contraction stress is applied to the splines at their ends adjacent the nut. Under these conditions, the splines eventually provide a particularly efficient anchoring "knot".

In this respect, it may be noted that the efficiency of the fastening device of the present invention is improved considerably by the provision of integral deformable lugs on the tightening nut. In fact, during the tightening action exerted by the screw, these splines are caused to expand simultaneously with the distortion of the plug splines. Thus, the nut lugs bear against the inner face of the corresponding wall or partition through the medium of the distorted end portion of the plug.

A double anchoring action is thus obtained, and this constitutes a particularly advantageous feature of the fastening device of this invention.

However, other features and advantages of this invention will appear as the following description proceeds with reference to the accompanying drawing.

BRIEF DESCRIPTION OF THE DRAWINGS

FIG. 5 is a fragmentary longitudinal section showing the same device after its insertion through a bore made in a hollow partition, but before tightening the screw;

FIG. 6 is a view similar to FIG. 5 showing the condition of the device during the fastening operation and before the latter is completed;

FIG. 7 is a perspective view showing the "knot" formed by the splines at the end of the fastening operation, and FIG. 8 is an elevational view showing the anchoring knot obtained with a modified form of embodiment of the fastening device of this invention.

DESCRIPTION OF THE PREFERRED EMBODIMENT

Figure 1:
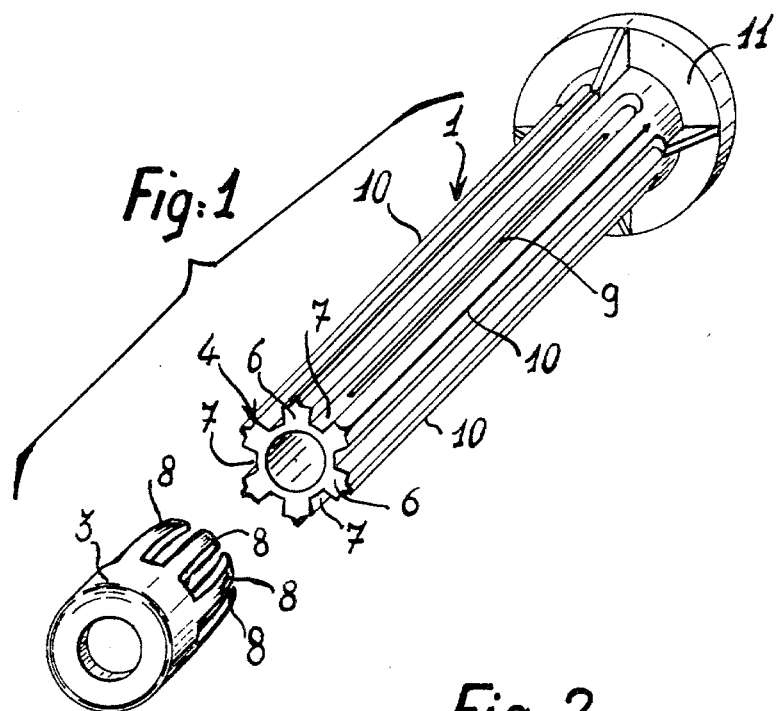
FIG. 1 is a perspective view of the plug and nut assembly constituting the improved fastening device of this invention.
Figure 2:
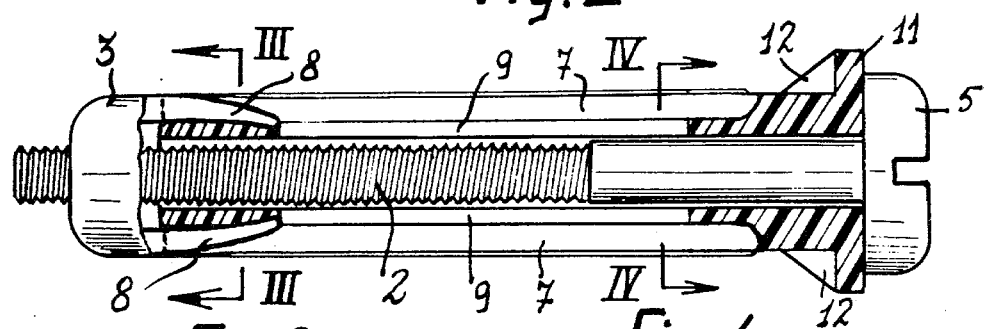
FIG. 2 is an axial longitudinal sectional view of the device.
Figure 3:
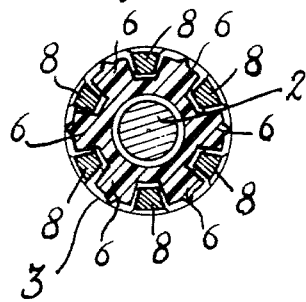
FIGS. 3 and 4 are cross-sectional views taken along the planes III-III and IV-IV of FIG. 2, respectively.
Figure 4:
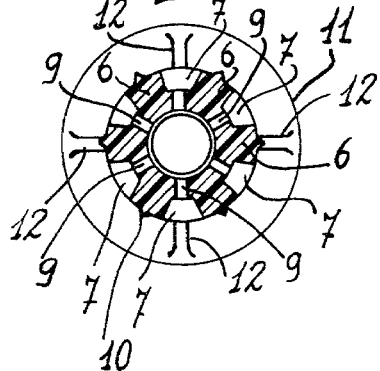

The improved fastening device of the present invention, as shown in FIGS. 1 to 4, comprises a tubular plug 1 of deformable material, through which a screw 2 provided with a tightening nut 3 is inserted. The nut normally registers with the inner end 4 of the plug, i.e. the end adapted to be introduced first into the bore formed through the wall or partition. The head 2 of the screw 2 registers with the opposite end of the plug.

Formed on the outer, substantially cylindrical surface of plug 1 are a plurality of spaced longitudinal splines 6 extending throughout the plug length and separated by gaps or grooves 7. Now, on its face registering with the plug 1, the nut 3 has formed a plurality of projecting lugs 8 corresponding in number to said gaps 7, so that each gap 7 receives a corresponding lug 8 at the corresponding end 4 of the plug (see FIGS. 3 and 2). Preferably, the lugs 8 are slightly curved inwardly and their inner radial dimension at their tip is such that they resiliently clamp the plug end 4. It will also be seen that these lugs 8 are advantageously flexible, the nut 3 being manufactured from a suitable resilient or slightly deformable material, or any other adequate material.

In the bottom of each gap 7, intermediate the adjacent splines 6 of the plug, a longitudinal slit 9 is formed. These slits extend throughout the plug length, except at the ends thereof. Thus, the splines 6 are completely independent of each other along the greater part of their length.

Preferably, these splines are each provided with a sharp-edged median rib 10 extending throughout the spline length. The function of these ribs 10 is to prevent the plug from rotating about its axis during the first few turns of the screw 2. In fact, in this case the ribs 10 grip the inner wall of the bore in which the fastening device is inserted.

As already mentioned in the foregoing, this device is intended notably for use when any object has to be fastened against a hollow partition such as the partition shown in FIGS. 5 and 6, which comprises two portions 13, 14 separated by an air gap 15. The length E of the plug 1 is in this case considerably greater than the thickness e of the first portion 13 of this partition. Thus, the plug 1 will protrude along a substantial portion of its length within the air gap 15 existing between the wall portions 13 and 14, in which the tightening nut 3 carried by the screw is located. In the example illustrated in FIGS. 5 and 6, the device of this invention is used for securing to the corresponding partition a fastening lug 16 solid with an object, the screw 2 extending through a hole formed in this lug 16.

When the screw 2 is turned in the tightening direction, the nut is prevented from rotating by the plug 1 and translated in the direction of the arrow F, FIG. 5. Thus, the longitudinal splines 6 of the plug are contracted and therefore caused to expand along their portions located outside the first portion 13 of the partition.

However, when a relatively strong resistance counteracts the translation of nut 3, continuing the screw rotation will cause the nut proper to rotate until it is locked completely. Now, this nut rotation is attended by the torsion or twisting of the longitudinal splines 6 of the plug, at least in the previously contracted portions thereof.

Under these conditions, the splines are eventually caused to form a kind of knot 17 in the form of a rosette, as shown in FIG. 7. This knot constitutes a particularly efficient anchoring means strongly adhering to the inner face of the first portion 13 of the partition.

It will also be seen that the anchorage knot thus obtained is reinforced by the lugs 8 of nut 3 which have been opened out somewhat but remain still engaged in the gaps 7 formed between the plug splines 6 at the corresponding end of the plug. Besides, it may be emphasized that the deformable lugs of nut 3 have likewise undergone a certain torsion like the corresponding portion of the plug splines. Therefore, these lugs become an integral part of the anchoring knot so as to reinforce same, inasmuch as said lugs are opened out so as to partake efficiently in the fastening action of the device. Thus, the device of this invention is safely protected against any accidental removal, even when the device is used for securing relatively heavy objects to a wall or partition.

FIG. 8 illustrates the anchorage device obtained by using a different form of embodiment of the present invention, in which the deformable lugs 8a of the corresponding nut 3a are somewhat longer and thinner than those of the preceding form of embodiment. In this case, a more pronounced torsional effort is exerted on the lugs 8a so that their diverging tips are sunk into the knot formed by the twisted splines 7 of the plug. Thus, the resulting anchoring action is more reliable.

However, a more or less accentuated torsion of the deformable nut lugs may be obtained, together with a more or less pronounced outflaring of these lugs, by varying the length and cross-sectional dimension of these lugs, or alternatively by choosing a different material for manufacturing the nuts. In fact, the nut may be made from metal stock or moulded from a synthetic resin of adequate strength.

The plug proper, considering its specific structure may be manufactured in the form of a continuous extruded rod. In fact, the splines 6 as well as the ribs 10 may easily be obtained by extrusion. The slits 9 may on the other hand be formed after cutting the various sections which are to constitute as many plugs.

On the other hand, each plug may advantageously comprise an annular flange 11 at its end adjacent the screw head 5. In this case, the inner face of flange 11 is connected to the plug body or shank by means of a plurality of triangular, spaced radial fins 12.

Finally, it will be readily understood by those conversant with the art that notwithstanding the presence of this flange and of the radial fins, the plug may also be manufactured from a continuous extruded rod. In fact, the flange 11 and fins 12 may be formed after cutting each plug-forming section by introducing the latter into a suitable mold comprising on the one hand a cavity adapted to receive the plug body and on the other hand an impression shaped to form its end flange 11 and the associated radial fins 12.

What I claim as new is:

1. A fastening device of the type adapted to be inserted into a bore formed through a hollow partition or wall, which comprises a tightening screw provided with a head adapted to engage the outer surface of the partition, a nut screwed on the screw end opposite said head, a tubular plug of deformable material surrounding said screw and disposed between the screw head and said nut, on the outer surface of said plug, a plurality of longitudinal splines separated by gaps, in the bottom of each gap, a slit extending along at least one portion of the plug length, except at the ends thereof, on the nut face registering with said plug, a series of spaced deformable lugs equal in number to the gaps formed between the longitudinal splines of the plug, and each lug is engaged in a gap between two adjacent longitudinal splines of the plug, so that said nut cannot rotate relative to said plug when said tightening screw is screwed into the former and thereby said plines of said plug are not only being deformed in a longitudinal direction during the screwing but also twisted and intermingling with one another so as to form an anchoring knot, said lugs of said nut being so deformable that when said splines of said plug are twisted, said lugs of said nut are also twisted and still retained in said gaps between said splines so as to form an integral part of said anchoring knot.

2. A fastening device as claimed in claim 1, wherein said deformable lugs carried by said tightening nut are slightly curved inwardly and adapted to clamp the corresponding plug end between them.

3. A fastening device as claimed in claim 1, wherein said longitudinal splines are originally straight, prior to the screwing of said tightening screw into said nut.

4. A fastening device as defined in claim 1, wherein each of said gaps separating said splines of said plug has a predetermined shape and dimension, each of said lugs of said nut having a shape and dimension corresponding to the shape and dimension of each of said gaps.

5. A fastening device as defined in claim 1, wherein said lugs of said nut are resilient metallic lugs forming a metal core of said anchoring knot.

* * * * *